United States Patent [19]

Wakabayashi et al.

[11] 4,320,968
[45] Mar. 23, 1982

[54] FAULT LOCATION SYSTEM IN AN OPTICAL FIBER TRANSMISSION SYSTEM

[75] Inventors: Hiroharu Wakabayashi, Kawasaki; Hideharu Tokiwa, Tokyo, both of Japan

[73] Assignee: Kokusai Denshin Denwa Co., Ltd., Tokyo, Japan

[21] Appl. No.: 131,396

[22] Filed: Mar. 18, 1980

[30] Foreign Application Priority Data

Mar. 23, 1979 [JP] Japan .................................. 54-33254

[51] Int. Cl.³ ........................................... G01N 21/88
[52] U.S. Cl. ...................................... 356/73.1; 356/5; 356/237
[58] Field of Search ............................ 356/73.1, 237, 5

[56] References Cited

U.S. PATENT DOCUMENTS 3,412,323  11/1968  Unterberger et al. ............... 324/338
3,751,606  8/1973  Kaiser, Jr. ............................ 324/52 X

FOREIGN PATENT DOCUMENTS 54-7361  1/1979  Japan ................................. 356/73.1

OTHER PUBLICATIONS

Report #946 "An Analysis Relating to the Fault Location in an Optical Fiber System" 1976, Inst. of Elect. & Comm. in Japan.
Report #S3-13 "Accuracy of the Fault Location ... by the Frequency Difference Method" 1976, Inst. of Elect. & Comm. in Japan.
"Frequency-Modulated Fault Location for Power Lines" Stevens et al., IEEE Trans. Power App. & Syst. vol. PAS91, No. 5, Sep.–Oct. 1972, pp. 1760–1768.

*Primary Examiner*—Vincent P. McGraw
*Attorney, Agent, or Firm*—Ratner & Prestia

[57] ABSTRACT

A fault location system for locating the fault point of an optical fiber transmission system has been found. The present system comprises a laser for generating an optical beam, a sweep oscillator for modulating said laser beam, a half mirror mounted between the outlet of the laser and the inlet of the optical fiber to be tested, an optical receiver for converting the optical beam reflected by the fault point to an electrical signal through said half mirror, a modulator for providing the frequency difference between the instantaneous output frequency of said sweep oscillator and the output frequency of said optical receiver, a low pass filter connected to the output of said modulator, and a spectrum analyzer connected to the output of the low pass filter. The present system has the advantage that the S/N of the system is excellent, and plural fault points can be located at the same time.

1 Claim, 3 Drawing Figures

FAULT LOCATION SYSTEM IN AN OPTICAL FIBER TRANSMISSION SYSTEM

BACKGROUND OF THE INVENTION

The present invention relates to a system for locating fault points of an optical fiber. The present invention can provide the quick locating of fault points so that the quick repair of an optical fiber transmission line can be done.

An existing fault locating system for an optical transmission line is a pulse echo system utilizing the reflection of optical pulse from a fault point. The principle of that system is shown in FIG. 1. The pulse signal from the pulse generator 1 drives the laser 2, so that an optical pulse signal is generated. The optical pulse signal is coupled into the optical fiber 4 which has a fault, through the optical divider or the half mirror 3. The optical fiber 4 is assumed to be broken at the point 5. Therefore, the optical pulse signal sent from the laser 2 is reflected at the break point 5, and the reflected optical pulse signal goes back to the half mirror 3. The reflected optical pulse signal through the half mirror 3 is received by the optical receiver 6. The optical receiver 6 converts the reflected optical signal to an electrical signal so that the reflected pulse signal is observed on the screen of the oscilloscope 7. The horizontal line of the oscilloscope 7 is begun to sweep by the trigger pulse which is provided simultaneously with the output pulse by the pulse generator 1. Then the time-interval between the reflected pulse and the trigger pulse can be measured through the screen of the oscilloscope 7. The measured time-interval thus shows practically the length between the optical divider 3 and the break point 5, since the transmission speed of the optical signal in the optical fiber is predetermined. Thus, the break point 5 can be located.

The pulse echo system mentioned above is fundamentally the same as that used for a transmission line composed of a conductive wire.

However, the reflection at the break point of an optical fiber is very little, while that of a conductive wire is large. The reflection coefficient at the break point of an optical fiber is generally less than 4% and depends strongly upon the shape of the break point. For instance, if the broken face at the break point is inclined more than 6 degrees with regard to the plane which is right vertical to the axis of the optical fiber, the reflection coefficient is very little.

Further, the input power of the optical signal can not be increased enough to provide the desired signal-to-noise ratio, since both the output power of a laser and the coupling efficiency between a laser and an optical fiber are restricted. Moreover, it has been known that an optical fiber loss caused by Raman Scattering becomes high when the transmission power is too large, and therefore, available input power of an optical fiber is also restricted. Accordingly, the level of the optical signal received by the optical receiver 6 is not so high, and then, there is little prospect of the good signal-to-noise ratio (S/N) at the output of the optical receiver 6.

When a single mode optical fiber is concerned, that situation becomes more severe. That is to say, the receiving level for single mode optical fiber at the receiver 6 is lower than that for a multimode optical fiber, and the coupling coefficient of a single mode optical fiber is also less than that of a multimode optical fiber. Thus, the S/N is further reduced when a single mode optical fiber is utilized. Furthermore, when a single mode optical fiber is utilized, the interval between repeaters can be made longer than that when a multimode optical fiber is utilized, and so the attenuation of an optical pulse from the pulse generator to the fault point becomes large when a single mode optical fiber is utilized. Therefore, the fault location for a single mode optical fiber by an existing pulse echo system shown in FIG. 1 is almost impossible to be realized. Other existing arts are a pulse difference method disclosed in the report No. 946, in the national convention record in 1976 organized by the Institute of Electronics and Communication in Japan, and a frequency difference method disclosed in the report No. S3-13 in said national convention record on light and electromagnetic waves section in 1976. Those existing arts utilized a sine wave as a measuring signal for locating the fault point, and could solve in part the problem of the S/N. Those systems utilize the principle that the phase of the composite waves of the reflection wave from the break point and the reflection wave from the inlet to the optical fiber, is proportional to the length to the break point and the frequency of the transmission signal. Therefore, by measuring the frequency difference for providing the predetermined phase difference, for instance the phase difference $\pi$, the length to the break point can be measured. However, when there are more than two break points, only the composite phase from the two break points can be measured. Therefore, the length to each individual break point can not be measured.

SUMMARY OF THE INVENTION

It is an object of the present invention, therefore, to overcome the disadvantages and limitations of a existing fault location system in an optical fiber by providing a new and improved system for locating a fault point in an optical fiber.

Another object of the present invention is to provide a fault location system in an optical fiber, which provides the sufficient signal-to-noise ratio, and can locate a plural fault points at the same time.

The above objects are attained by a fault location system for an optical fiber comprising a laser for generating an optical beam, a sweep oscillator for modulating said laser, a half mirror mounted between the outlet of said laser and the inlet of the optical fiber to be tested, an optical receiver for converting the optical beam reflected at the fault point in the optical fiber to an electrical signal through said half mirror, a modulator for providing the frequency difference between the instantaneous output frequency of said sweep oscillator and the output frequency of said optical receiver, a low pass filter connected to the output of said modulator, and a spectrum analyzer connected to the output of the low pass filter.

Preferably, the sweep speed of said sweep oscillator is 100 MHz/Sec., and the cutoff frequency of said low pass filter is 40 KHz.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
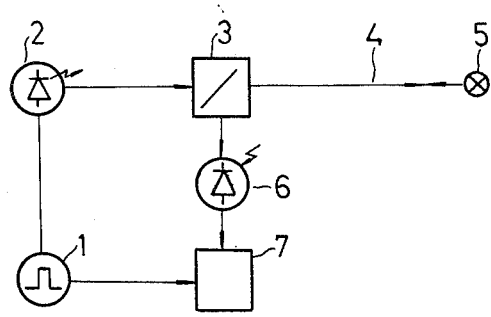
FIG. 1 shows a existing fault point locating system for an optical fiber.
Figure 2:
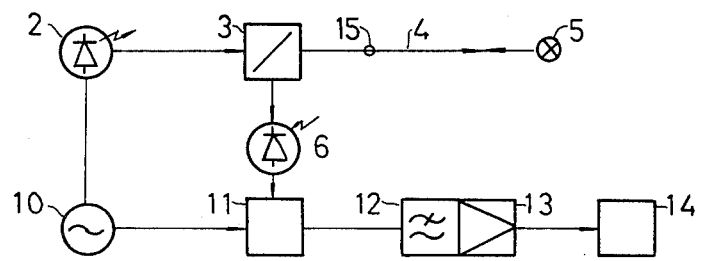
FIG. 2 shows the block diagram of the system for locating the fault point in an optical fiber according to the present invention.

FIG. 2 shows the schematic configuration of the present fault location system for an optical fiber transmission line. In the figure, the reference numeral 10 is a sweep oscillator, 11 is a modulator, 12 is a low-pass filter, 13 is an amplifier, 14 is a spectrum analyzer, and 15 is the inlet of the optical fiber to be tested. The reference numerals 2 through 6 are the same as those in FIG. 1, and 2 is a laser, 3 is an optical divider or a half mirror, 4 is an optical fiber transmission line, 5 is a fault point on the transmission line, and 6 is an optical receiver.

The sweep oscillator 10 sweeps the output frequency from $f_0$ Hz to $f_1$ Hz, and the sweep speed is $f_s$ Hz/second. The output of the sweep oscillator 10 is applied to the laser 2 to energize and modulate the optical output of the laser 2. The modulated optical output of the laser 2 is introduced in the optical fiber 4 through the optical divider 3 and the inlet 15. It is supposed that the optical fiber 4 is broken at the point 5. Accordingly, the optical signal from the laser 2 is reflected at the fault point 5, and the reflected optical signal is applied to the optical receiver 6 through the optical fiber 4 and the optical divider 3. The optical receiver 6 converts the optical power thus received from the fault point 5 to the electrical signal, which is applied to the modulator 11.

The modulator 11 also receives the output of the sweep oscillator 10, therefore, the modulator 11 provides the sine wave output frequency which is the difference between the instantaneous frequency of the sweep oscillator 10 and the output frequency of the optical receiver 6. The output frequency of the modulator 11 is applied to the input of the spectrum analyzer 14 through the low pass filter 12 and the amplifier 13. Then, the output frequency is displayed on the screen of the spectrum analyzer 14.

It should be appreciated that the output frequency of the modulator 11 is $f_s \cdot \Delta T$, provided that $\Delta T$ is the time that the optical signal goes from the sweep oscillator 10 to the optical receiver 6 through the laser 2, the optical divider 3, the optical fiber 4, the fault point 5, the optical fiber 4 (return path), and the optical divider 3. That ($f_s \cdot \Delta T$) will be explained in accordance with FIG. 3.

Figure 3:
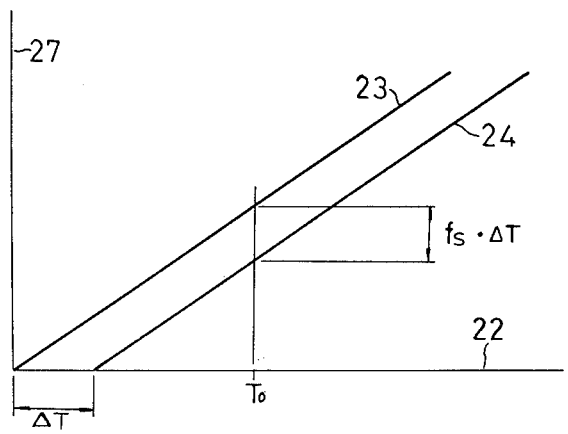
FIG. 3 shows the curves of the output of the frequencies of the sweep oscillator 10 and the optical receiver 6 in FIG. 2.

In FIG. 3, the horizontal axis 22 shows the time and the vertical axis 27 shows the frequency. The linear line 23 shows the change of the output frequency of the sweep oscillator 10, and the linear line 24 shows the change of the frequency of the reflection signal received by the optical receiver 6.

It should be noted, that the difference between the line 23 and the line 24 is $f_s \cdot \Delta T$, and said difference is obtained at the output of the modulator 11 so long as the sweep oscillator 10 operates. The output frequency $f_s \cdot \Delta T$ at the output of the modulator 11 is proportional to the round delay time of the optical signal which travels from the inlet of the optical fiber 4 to the same through the fault point 5. Since the value $f_s$ is predetermined and known, the value $f_s \cdot \Delta T$ indicated on the screen of the spectrum analyzer 14 can provide the value $\Delta T$, which provides in turn the length from the inlet of the optical fiber 4 to the fault point 5.

When there are plural reflection points in the optical fiber 4, each reflection signal at each reflection point has a specified frequency, and the output frequency of the modulator 11 depends upon each reflection point. Therefore, plural points are observed on the screen of the spectrum analyzer 14, and each point on the screen indicates each individual fault point. Therefore, each fault point can be easily discriminated from others on the screen of the spectrum analyzer.

When the sweep speed of the sweep oscillator 10 is 100 MHz/Sec., and the length between the half mirror 3 and the fault point 5 in the optical fiber 4 is 2 Km, the value of $f_s \cdot \Delta T$ is, then, 2 KHz. Since the length between each repeaters in an optical communication system utilizing an optical fiber is generally supposed to be in the range from 30 Km to 40 Km, the desired maximum value of $f_s \cdot \Delta T$ is approximate 40 KHz for discriminating the fault point in that range. Accordingly, the cutoff frequency of the lowpass filter 12 should be designed to be 40 KHz. Compared with a existing pulse echo method in which the bandwidth of the receiving unit in that method is wider than 4 MHz, the present invention can improve the S/N by 40 dB (20 log (4000/40)=40 dB).

All the equipments shown in FIG. 2 can be commercially purchased. The laser 2 can be HLP1000, HLP2000, or HLP300 manufactured by Hitachi Co. Ltd., in Japan, or ML4000 or ML7000 manufactured by Mitsubishi Electric Co. Ltd., in Japan. The optical receiver 6 can be an avalanche diode PD1000 or PD7000 manufactured by Mitsubishi Electric Co. Ltd., in Japan. The sweep oscillator 10 can be 3325A manufactured by Hewlett-Packard Co. in U.S.A. And the spectrum analyzer 14 can be 3580A manufactured by Hewlett-Packard Co. in U.S.A.

As described above in detail, the present invention measures the fault point in the frequency domain by converting the delay time of the optical signal in the optical fiber to the change of the frequency of the sweep oscillator, and the result is displayed on the screen of the spectrum analyzer. Therefore, the S/N of the reception signal is considerably improved, and plural fault points can be located at the same time.

From the foregoing, it will now be apparent that a new and improved fault location system for an optical fiber transmission system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A fault location system for an optical fiber transmission system comprising a laser for generating an optical beam; a sweep oscillator for frequency modulating said optical beam, said sweep speed of about 100 MHz;

a half mirror mounted between said laser and an inlet of said optical fiber transmission system, said optical beam entering said inlet and being reflected by a plurality of fault points in said optical fiber transmission system with each fault point having a specified reflected frequency;

an optical receiver for converting said optical beam reflected by said fault points to electrical signals;

a modulator coupled between said sweep oscillator and said optical receiver for providing an instantaneous frequency difference between said sweep oscillator and said optical receiver;

a low pass filter coupled to said modulator, said low pass filter having a cutoff frequency of 40 KHz; and a spectrum analyzer coupled to said low pass filter for detecting said plurality of fault points.

* * * * *